Patented June 9, 1942

2,285,443

UNITED STATES PATENT OFFICE 2,285,443

METHOD OF MAKING ZIRCONIUM NITRATE

Charles J. Kinzie and Donald S. Hake, Niagara Falls, N. Y., assignors to The Titanium Alloy Manufacturing Company, New York, N. Y., a corporation of Maine No Drawing. Application June 29, 1940, Serial No. 343,262

4 Claims. (Cl. 23—102)

This invention relates to a new and improved method of preparing zirconium nitrate.

Zirconium nitrate is a material which has been known for many years. Various writers have described methods of preparing this material, which more properly is called zirconyl nitrate. It is a material of variable composition and supposedly has the formula $ZrO(NO_3)_2.2H_2O$, or $ZrO(OH)_2.—ZrO(NO_3)_2.4H_2O$, etc. The methods hitherto employed for its manufacture, however, have the disadvantage that they are relatively expensive. As a result, zirconium or zirconyl nitrate has not hitherto been extensively used in commerce, and has only been produced in small quantities.

It is therefore an object of this invention to produce zirconium nitrate cheaply and inexpensively. Other objects will appear hereinafter.

These objects are accomplished by reacting zirconium chloride or zirconium oxychloride (zirconyl chloride) with nitric acid or nitrogen oxides.

The starting material, $ZrCl_4$, is easily prepared by any well known method. Preferably zirconium cyanonitride, zirconium carbide, zirconium carboxide, or a mixture of two or more of these materials is heated in a gas tight refractory vessel while being subjected to the action of chlorine gas. The refractory vessel is connected to a suitable condenser, where the $ZrCl_4$ formed condenses as a solid. The chlorine gas is forced through the charge in the refractory vessel at such a rate as to avoid escape of free chlorine.

The $ZrCl_4$ can be converted to $ZrOCl_2$ or used directly as such. If converted to $ZrOCl_2$, this may conveniently be done by exposing the $ZrCl_4$ to a current of moist air while preferably in a slowly moving state, which effects a conversion of $ZrCl_4$ to $ZrOCl_2$. The $ZrOCl_2$ remains as a solid crystalline water soluble powder while the chlorine liberated forms hydrochloric acid, which is absorbed or condensed and recovered.

Alternatively, $ZrOCl_2$ can be prepared directly by adding barium chloride to a solution of zirconyl sulfate in an amount exactly sufficient to precipitate all the sulfate as barium sulfate, and filtering. $ZrOCl_2$ can be crystallized by concentrating the hot filtrate and then cooling, or by adding to the filtrate strong hydrochloric acid, in which $ZrOCl_2$ is insoluble. In either case the crystalline salt is recovered by centrifuging or filtering. Zirconyl sulfate solution may be prepared by dissolving zirconium oxide, zirconium carbide, zirconium cyanonitride or zirconium carboxide in sulphuric acid, and dissolving the resultant zirconium sulfate cake in water so as to remove any insoluble residue.

Zirconium chloride or zirconium oxychloride, solid or in solution, is then reacted with an excess of nitric acid or with nitrogen oxides in the presence of water. The hydrogen chloride formed, together with water and excess nitric acid, is driven off by heating the mixture. As the mass approaches dryness, a damp mass of crystals is formed which upon continued heating alters to a dry white crystalline powder. The reaction that takes place can be roughly represented by the following equations:

$$ZrOCl_2 + 2HNO_3 \rightarrow ZrO(NO_3)_2 + 2HCL$$
$$\text{or } ZrCl_4 + 2HNO_3 + H_2O \rightarrow ZrO(NO_3)_2 + 4HCl$$

The material formed in all cases has the characteristics of zirconium or zirconyl nitrate, and not of the oxychloride or other known zirconium compound.

The nitric acid or zirconium oxychloride solutions can be any convenient concentrations. Inasmuch, however, as the solution is ultimately to be evaporated to dryness, it is preferred to use solutions of higher concentrations, to avoid wasteful fuel consumption. The heat employed in the evaporation step should not be so great as to exceed the temperature at which zirconium nitrate decomposes, and is preferably a maximum of 100° C. (temperature at the conclusion).

The invention having been described, the following examples are now given. When parts are mentioned, parts by weight are understood.

EXAMPLE 1

Zirconium chloride is prepared by treating zirconium cyanonitride, zirconium carbide or zirconium carboxide with chlorine gas, as described above. The oxychloride is formed by slaking this material in a current of moist air, also as described above. The material has the following composition:

| | |
|---|---|
| Zirconium—calculated as Zr | 39.00 |
| Chlorine—calculated as Cl | 31.00 |
| Titanium—calculated as Ti | 0.02 |
| Fe—calculated as Fe | 0.02 |
| Si—calculated as Si | 0.02 |
| Balance—calculated as $H_2O$ | 29.94 |
| | 100.00 |

The calculated formula is $ZrOCl_2$ plus about $6H_2O$. This salt is dissolved in water so as to form a solution containing 15.36 parts of zirconium and 12.21 parts of chlorine per 100 parts of solution. Solid matter is eliminated by suitable clarification means.

60 parts of 1.42 sp. gr. nitric acid, which contains 70% $HNO_3$, is added to 100 parts of this $ZrOCl_2$ solution. The mixed solution is evaporated in a suitable vessel of porcelain or glass or acid proof enameled iron ware over a water bath maintained at a temperature of approximately 100° C. The charge becomes a damp mass of crystals which upon continued heating alters to a dry white crystalline powder of the following composition and characteristics:

*Chemical analysis*

| | |
|---|---|
| Zirconium—calculated as $ZrO_2$ | 44.93 |
| Nitrogen—calculated as N | 10.13 |
| Chlorides—calculated as Cl | 0.04 |
| Titanium—calculated as $TiO_2$ | Slight trace |
| Iron—calculated as $Fe_2O_3$ | 0.005 |
| Ignition loss—$H_2O$+nitrogen compounds | 55.24 |
| Water insoluble | 0.04 |

Physical and optical properties—a white free-flowing powder.

Index of refraction about 1.568.

Crystals very small but tending to crystallize in radial rosettes having birefringence of about 0.003.

EXAMPLE 2

Zirconium chloride as formed in Example 1 is charged directly into water, in which it dissolves with a vigorous reaction and a hissing sound, and with violence if additions of solid $ZrCl_4$ are not made with caution, so as to form a solution of zirconium oxychloride of approximately the same concentration as in Example 1. Solid impurities are removed, nitric acid added, and the material evaporated as in Example 1. This method has the advantage of removing all the chlorides in one step, but the disadvantage incidental to the violent reaction between the $ZrCl_4$ and water and the obnoxious fuming of the $ZrCl_4$, with evolution of dry HCl fumes, if it is handled in the open in a moist atmosphere.

EXAMPLE 3

100 parts of zirconium tetrachloride were gradually added to 160 parts of 70% concentrated nitric acid and clarified. The clarified solution was evaporated to dryness on a sand bath maintained at a temperature of approximately 190° C., care being taken to stir and avoid overheating during the drying stage. The residue was moistened with nitric acid and carefully taken to dryness again in order to expel all but a trace of chloride. The product was white in color and dissolved to a clear solution in distilled water. An analysis of this material shows about 47% $ZrO_2$ and about 40% $N_2O_5$, with substantially no chlorine.

EXAMPLE 4

A current of air was bubbled through boiling nitric acid, and the air thus laden with moisture and one or more gaseous oxides of nitrogen passed over zirconium oxychloride contained in a horizontal glass tube. The zirconium oxychloride glazed over and swelled up. When dissolved in water, acidified with sulfuric acid, and a layer of ferrous sulfate solution superimposed, a dark band appeared, indicating the presence of nitrate.

As compared with previous methods of making zirconium nitrate, the present method has the advantage of being remarkably economical and at the same time obtaining a product which is equally as good as that obtained by other methods. For example, the method hitherto customarily used, that disclosed by Welsbach in U. S. Patent No. 409,653, dated August 20, 1889, costs over four times the present method.

As many variations are possible within the scope of this invention, it is not intended to be limited except as defined by the appended claims.

We claim:

1. The method of making zirconium nitrate comprising reacting a metal-free compound from the group consisting of nitric acid and nitrogen oxides with a material taken from the class consisting of zirconium tetrachloride and zirconium oxychloride, in the presence of moisture, and carrying the reaction mixture thus obtained to dryness.

2. The method of making zirconium nitrate comprising reacting an aqueous solution of nitric acid with a material taken from the class consisting of zirconium tetrachloride and zirconium oxychloride, and evaporating the solution thus obtained to dryness.

3. The method of making zirconium nitrate comprising reacting an excess quantity of an aqueous solution of nitric acid with a material taken from the class consisting of zirconium tetrachloride and zirconium oxychloride, and evaporating the solution thus obtained to dryness.

4. The method of making zirconium nitrate comprising adding zirconium tetrachloride to an excess quantity of an aqueous solution of nitric acid, and evaporating the solution thus obtained to dryness.

CHARLES J. KINZIE.
DONALD S. HAKE.